July 22, 1969     J. W. KLOSS     3,457,018
DUAL RETICLE DEVICE

Filed July 26, 1965     3 Sheets-Sheet 2

FORM OF ORIGINATING BRIGHT-LINE RETICLES 13 & 20

FORM OF ORIGINATING BRIGHT-LINE READOUT RETICLE 12'

INVENTOR.
JOHN W. KLOSS
BY Raymond A. Paquin
ATTORNEY.

July 22, 1969

J. W. KLOSS 3,457,018

DUAL RETICLE DEVICE

Filed July 26, 1965

INVENTOR.
JOHN W. KLOSS
BY
Raymond A. Paquin
ATTORNEY.

United States Patent Office 3,457,018
Patented July 22, 1969

3,457,018
DUAL RETICLE DEVICE
John W. Kloss, Erie, Pa., assignor to Lord Corporation, Erie, Pa., a corporation of Pennsylvania
Filed July 26, 1965, Ser. No. 474,867
Int. Cl. G01b 11/26; G01j 3/46
U.S. Cl. 356—153          7 Claims

ABSTRACT OF THE DISCLOSURE

An optical measuring instrument for measuring the displacement of an object relative to a reference in which two beams of light respectively containing a reference reticle image and an object reticle image and each having a characteristic or identifying color or other component are each directed toward both reference and object mirrors respectively on the reference and object through filters which pass respectively to the reference and object mirrors the characteristic colors of the reference and object beams and which block respectively from the reference and object mirrors the characteristic colors of the object and reference beams. This provides an identification of the signals from the reference and object mirrors which aids in discrimination.

---

This invention relates to new and improved instruments for measuring the displacement of two images simultaneously, such as the adaptation of an autocollimator or the like for measurement of the displacement of an object from a reference and the principal object of the invention is the provision of new and improved means for such an instrument.

Another object is to provide for filtering of sources and reflectors such that in a single instrument, one of a pair of reticles becomes associated with only one of a pair of reflectors, and the remaining reticle with the other reflector.

Another object is to provide a device of the type set forth which may be adapted to systems which are all visual or depend for their setting on visual setting and to systems which are partially automatic in operation and systems which are completely automatic.

Another object is to provide a system embodying the invention which is provided with means for distinguishing between the two images.

Another object is to provide adjustable scale factor in a readout reticle in order that the reticle may be made to subtend an angle at the eyepiece matching that generated by a transducer.

Another object is to provide a new and improved eyepiece for instruments of the type set forth, which is direct reading of the distance between two images.

Another object is to provide a new and improved reticle carrier mechanism for instruments of the type set forth and embodying dual reticles and which allows direct reading of the distance between the images of the reticles.

Other objects and advantages of the invention will be apparent from the following description taken in conjunction with the accompanying drawings wherein embodiments of the invention have been shown by way of illustration only.

Referring to the drawings.

Referring more particularly to the drawings wherein similar reference characters designate corresponding parts throughout, and in which the invention is shown embodied in an autocollimator.

Figure 1:
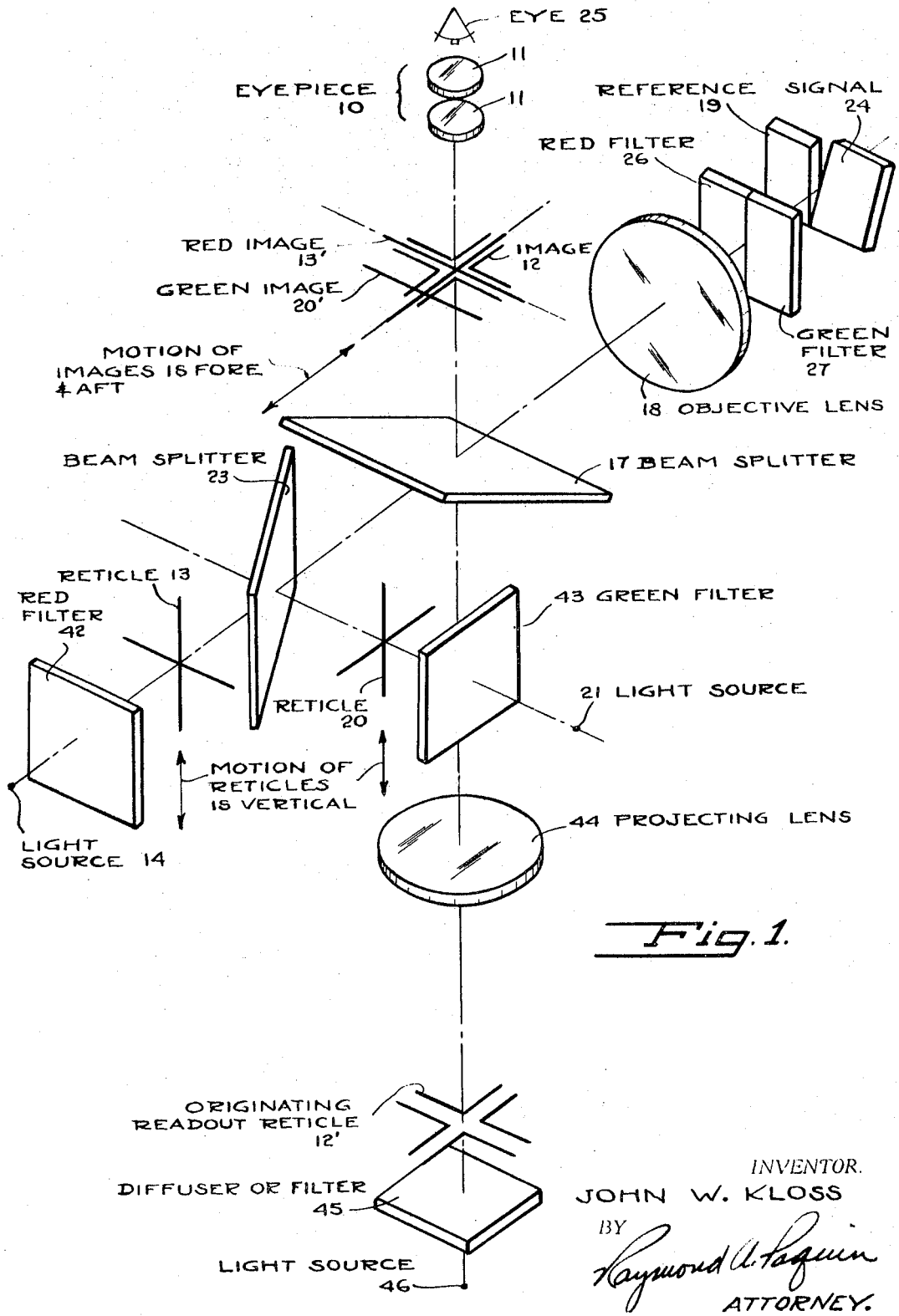
FIG. 1 is a schematic view of an autocollimator embodying the invention.
Figure 2:
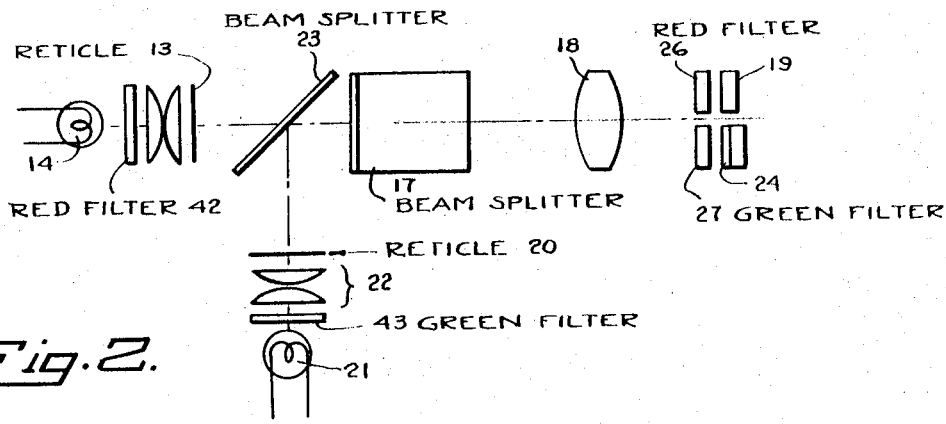
FIG. 2 is a plan view of the form of the invention shown in FIG. 1.
Figure 3:
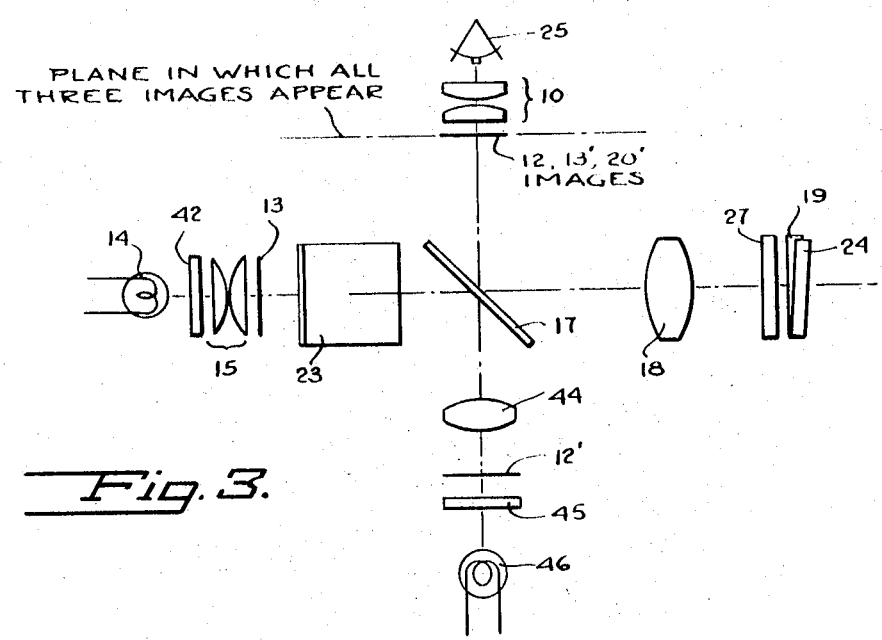
FIG. 3 is a side view of the form of the invention shown in FIGS. 1 and 2.
Figure 4:
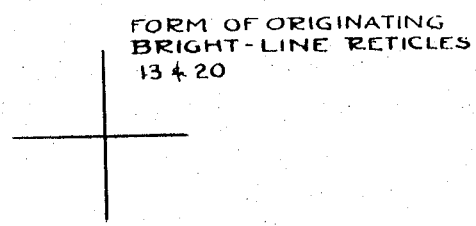
FIGS. 4 and 5 are views illustrating the reticles embodied in the form of the invention shown in FIGS. 1 to 3.

In the form of the invention shown in FIGS. 1 to 5 the two images of reticles are observed visually in the field of view of the eyepiece designated generally at 10 and including the eyepiece lenses 11 and eyepiece reticle image 12.

An image of originating adjustable reticle 13 (the reference reticle image) is projected by light source 14, filter 42 and projection lens system 15 through beam splitter 23, through beam splitter 17 and objective lens 18 to reference reflector 19.

An image of originating adjustable reticle 20 (the object reticle image) is projected by light source 21, filter 43 and projection lens system 22 to beam splitter 23 by which it is reflected through beam splitter 17 and objective lens 18 to object or signal reflector 24.

The reticles 13 and 20 are each independently movable or adjustable vertically as indicated by the double ended arrows in FIG. 1 by any suitable means such as micrometers.

The images of originating reticle 13 and originating reticle 20 are then reflected back by reflectors 19 and 24 respectively through objective lens system 18 to beam splitter 17 by which they are reflected to eyepiece 10 wherein they are viewed by the eye 25 of the observer or operator, as images 13' and 20'.

An eyepiece stationary reticle is provided at 12 in the field of view of eyepiece 10 by projecting originating readout reticle 12' through projection lens 44, light for this purpose being supplied by light source 46 diffused or filtered by 45. The projection system 46 45 12' 44 can be folded to lie parallel to the axis of the autocollimator by inserting a mirror between projection lens 44 and beam splitter 17. Alternately, if a dark-line reticle can be employed, an actual reticle can be mounted at position 12 and the auxiliary projection system 46 45 12' and 44 be dispensed with.

If the system is all visual, or depends for its initial alignment on visual setting, it will be desirable to have colored images to inform the operator which mirror or reflector the signal is coming from. This can be done by using colored light as source light in the autocollimator and having the return images filtered as by employing the color filters 26 and 27 of contrasting color in optical alignment with reflectors 19 and 24, respectively.

In the drawing the filters 26 and 42 are indicated as being, by way of example, red filters and the filters 27 and 43 are indicated, also by way of example, as green filters. They could be of any desired contrasting colors.

In this way the color filters 26 and 27 are in position to pass only the particular color desired to be associated with the particular reference and signal mirrors, and while light going out from the autocollimator contains two colors, that coming back from reflectors 19 and 24 is colored depending on which mirror is involved, the remaining color having been absorbed.

Perhaps a better system of achieving color, from the standpoint of definition, would be to have a light source which is discrete in wavelength output, as for instance, mercury. One color could then be used for the reference and another of the spectrum lines for the other color. The filters would then be required only to differentiate between the colors, not being so sharp as to themselves form monochromatic light. For example, a yellow filter will pass a band of yellow through red, but it will pass only monochromatic red if it is asked to pass both blue and red spectrum lines and nothing else is incident.

If extreme accuracy is wanted in using light of two different colors, it will be necessary to make the geometry of the system correspond to the particular wavelength used. That is, chromatic abberation of the focus of the objective lens must be allowed for, and perhaps the reticle micrometer will need to be adjusted to allow for the different lens-to-image distances.

The purpose of the invention is to measure the displacement of two images simultaneously.

In the example of FIG. 1, the two images are caused by the two mirrors 19 and 24 feeding back into the autocollimator.

One of the images might be the image from the reference mirror 19 and the other the signal mirror image of a motion-optical transducer or proving ring. Readout can be manually set and read after removing the eye from the eyepiece or it may be manually set with the two settings actuating such devices as differential transformers and the electrical signals subtracted, or it might even be completely automatic with a photosensitive reticle being moved in response to servo error signal, and the readout being by differential transformer from the moved reticles.

The basic method proposed by this form of the invention is to use two originating reticles, each independently movable, and a single readout reticle. Each of the originating reticles may occupy half of the filed of view, or they may each cover all the field, one being used for the reference mirror and the other for the signal mirror.

If no filters are used, each of the two mirrors sends back two images of each reticle but filtering at the mirrors will make one pair of images one color and the other pair of images another color. Further filtering at the sources will eliminate two of the images, leaving only the desired two, one associated with one reticle and mirror and the other associated with the other reticle and mirror.

The readout reticle will need to have some reminder of the colors used or else the operator must remember which is which.

In the use of the full visual system, the operator moves the two originating reticles until their images fall within the bifilar lines of the readout reticle. For ease in setup and to make it possible to get the autocollimator lined up with the mirrors, a second line is included on the originating reticles at right angles to the first, and a second bifilar is crossed with the first in the readout reticle. These second lines are used in the conventional way with the autocollimator to line up the axis from which signals are not to be received.

Electrical readout can be provided in any of several ways.

It is possible to put differential transformers on the retical mechanism and subtract their outputs, either while the output signals are A.C. voltages or after rectifying them into D.C. voltages. A D.C. difference signal can drive a digital voltmeter for readout of the difference between reticle positions, and by calibration, it is reading the difference between reference mirror and signal mirror tilt angles, or quantites related to those angles.

Other methods of sensing the location of the reticles are: strain gauges on flex plates supporting and guiding the moving reticles; rotation coding of the micrometer wheel to drive a digital computer and printer; a helical potentiometer (helipot) driven by micrometer.

Mechanical subtraction of the signals could be accomplished by linkages and levers, and the resulting difference, which would probably appear as an angle, be read.

Complete servo operation would require a photosensitive reticle, the error signal from which would drive a servo motor to reduce the error to zero. It would possibly be necessary to do the initial "locking on" visually, because color coding will do little for a color blind photosensitive plate, although it might be possible to employ a color sensing plate for the reticle.

Division of the originating reticle into halves of the field would simplify the automatic methods in that color sensing photocells would be unnecessary. Color filtering of sources and mirrors remains necessary however.

For the visual system, the reticles should preferably present bright lines on a dark field. Dark lines on a bright field result in two overlapping fields of different colors and in confusion. Bright lines on a dark field (not necessarily a totally black field) would present lines easily distinguished from each other and identifiable.

Figure 5:
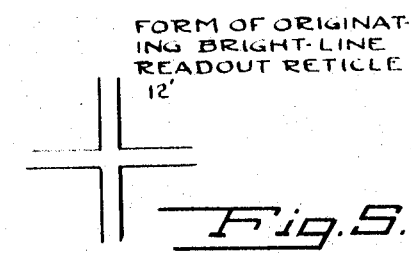

Depending on the sensitivity desired, reticle 12 may be a simple cross line or any of several bifilar forms, and may be provided with graduations. One form of crossed bifilar is shown in FIGS. 1 and 5.

A bright line readout reticle can be provided by projecting an image of a dark field reticle to form an image in the eyepiece field of view, projecting by means of an additional lens 44 from below beam splitter 17.

The image which is then used as a bright readout reticle can be made adjustable in size by moving its originating reticle and its projecting lens. In this manner a single originating reticle graduated let us say in millimeters can be made to subtend an angle at the eyepiece appropriate to the sensitivity of some transducer which operates signal or object mirror 24.

Figure 6:
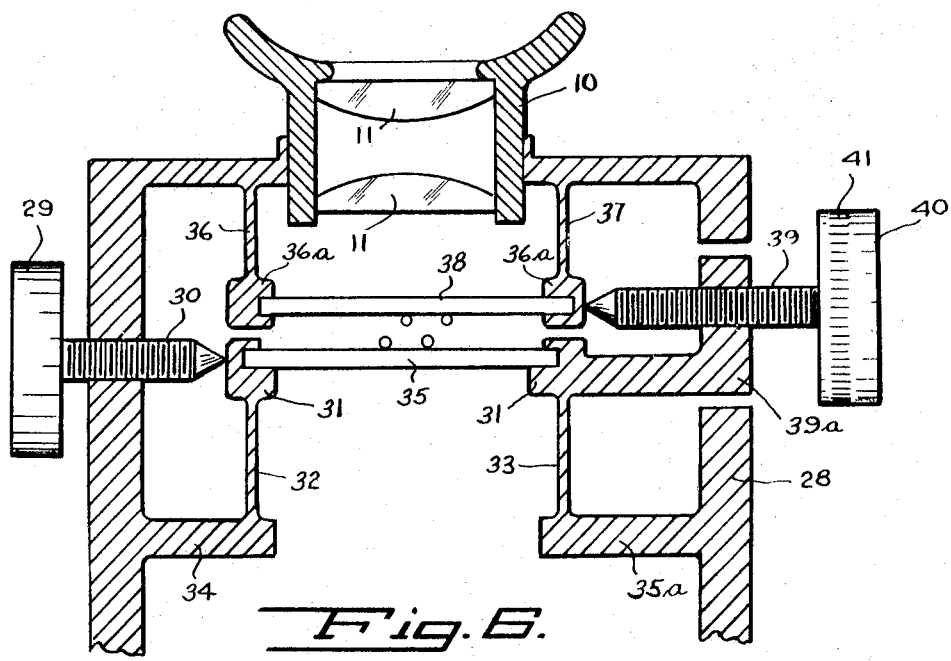
FIG. 6 is a sectional view showing a reticle arrangement of the invention embodied in an eyepiece.
Figure 7:
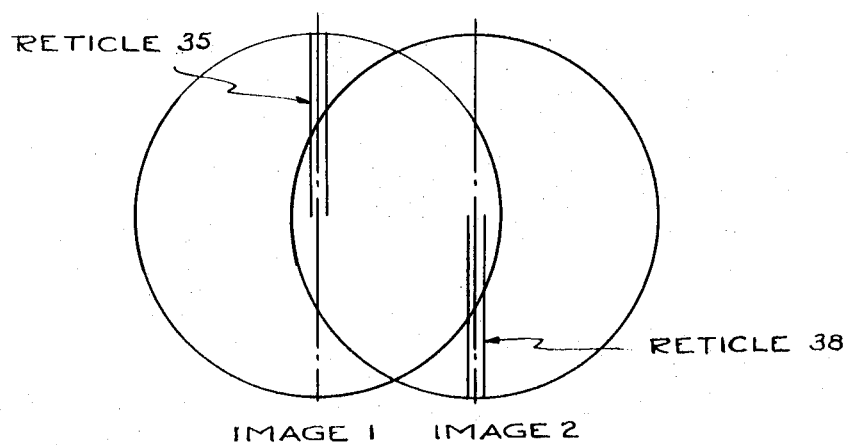
FIG. 7 is a view showing the images seen through the eyepiece arrangement of FIG. 6.

In the form shown in FIGS. 6 and 7, the reticles are shown embodied in an eyepiece with a direct reading micrometer. The remainder of the arrangement is simplified in that the originating reticles now need not be movable.

In this form of the invention, eyepiece 10 carries lenses 11 for viewing the two reticles simultaneously.

The eyepieces 10 is mounted on the housing in which is threaded adjusting knob 29, which may be graduated as a micrometer and which turns screw 30 which engages and moves movable carrier 31 which is sprung on flexures 32 and 33 which are connected to supports 34 and 35A respectively on housing 28 and said flexures 32 and 33 carry reticle 35.

Carrier 36A is sprung or mounted on flexures 36 and 37 which are connected to housing 28 and reticle 38 is sprung or mounted on supports 36 and 37 and is adapted to be adjusted by screw 39 which is threaded in nut 39a through turning of knob 40 which carries the graduations 41 as a micrometer and rotation of knob 40 moves carrier 36a on which is carried reticle 38.

By means of eyepiece 10, the two reticles 35 and 38 may be viewed simultaneously through eyepiece lenses 11 and in operation, reticle 35 is aligned with the reference image and the reticle 38 is aligned with the signal or object image.

Since nut 39a for screw 39 is carried along with reference reticle 35, the micrometer 41 becomes direct reading of the distance between image 1 and image 2.

With the eyepiece of FIG. 6, and by altering the placement of objective lens 18 to make a common telescope rather than an autocollimator out of the arrangement (sources 14 and 21 being turned off), the dual reticles of the eyepiece of FIG. 6 can be used to measure the distance between any two images which may be caused to fall within in the field of the eyepiece.

By incorporating filters in the reticle supports or by dually filtering the source light, and by limiting the field of reticle 38 to one half of the total field and that of reticle 35 to the remaining half, the mechanism of the eyepiece of FIG. 6 can be used in place of reticles 13 and 20 and their associated sources, filters, and the beam splitter 23 to secure the results of the first form of the invention. The advantage would be in the use of a single screw 39 to make the differential measurement; a disadvantage is the restriction of half-field reticles.

For dynamic work, stroboscopic light sources can be employed with all of the forms of the invention discussed.

From the foregoing it will be seen that I have provided new and improved means for obtaining all of the object and advantages of the invention.

I claim:

1. An optical instrument for measuring the displacement of an object relative to a reference, said object and said reference respectively having object and reference reflectors, said reflectors being positioned to receive a beam of light and to reflect said beam, means for projecting a first beam of light from a reference reticle along an axis toward said object and reference reflectors, means for projecting a second beam of light from an object reticle along said axis toward said object and reference reflectors, each of said beams reflected from said reflectors forming reticle images in a field of view, the projected first beam of light comprising light of first identifying waves, the projected second beam of light comprising light of second identifying waves different from the first waves, means for preventing light of the first identifying waves from reaching and being reflected by the object mirror, means for preventing light of the second identifying waves from reaching and being reflected by the reference mirror, whereby the light reflected by each of the reflectors forms only one image in said field of view.

2. The instrument of claim 1 in which the first and second beams of light respectively have first and second identifying waves of first and second colors and the means for preventing reflection by the reference and object mirrors comprise filters which respectively pass the first and second colors and block the second and first colors.

3. The instrument of claim 1 having an eyepiece with an associated readout reticle for the images in said field of view.

4. The instrument of claim 1 in which the means for projecting the beams of light are each independently adjustable.

5. The instrument of claim 1 having readout means comprising a support, an eyepiece lens system carried by said support, a pair of reticles carried by said support, one of said reticles being adapted to be aligned with the reference image and the other of said reticles being adapted to be aligned with the signal image, and means for adjusting each of said reticles, said adjusting means comprising adjusting screws operatively connected to the respective reticles.

6. The instrument of claim 1 in which the axes of the light sources for the first and second beams are at right angles to each other and at 45° to a beam splitter which directs the beams along a common axis toward the reflectors.

7. The instrument of claim 1 having a third beam of light projected from a readout reticle to said field of view to form a readout reticle image for comparison with the reflected reference and object reticle images on said field of view.

References Cited
UNITED STATES PATENTS

| | | | |
|---|---|---|---|
| 2,038,914 | 4/1936 | Templeton | 88—14 X |
| 2,909,964 | 10/1959 | Keuffel et al. | 350—10 X |
| 3,229,562 | 1/1966 | Reisinger | 88—14 |
| 3,242,793 | 3/1966 | Caudill | 88—2.7 |
| 3,274,883 | 9/1966 | Kern | 88—14 |
| 3,302,511 | 2/1967 | Baker et al. | 88—14 |
| 3,331,650 | 7/1967 | Williams | 350—10 |

RONALD L. WIBERT, Primary Examiner

T. R. MOHR, Assistant Examiner

U.S. Cl. X.R.

356—173